(12) United States Patent
Srikrishna et al.

(10) Patent No.: US 8,306,041 B2
(45) Date of Patent: *Nov. 6, 2012

(54) DETERMINING BIDIRECTIONAL PATH QUALITY WITHIN A WIRELESS MESH NETWORK

(75) Inventors: Devabhaktuni Srikrishna, San Mateo, CA (US); Amalavoyal Narasimha Chari, Sunnyvale, CA (US); B. William Hong, San Jose, CA (US); Roman Arutyunov, San Diego, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 12/079,151

(22) Filed: Mar. 25, 2008

(65) Prior Publication Data

US 2008/0205420 A1 Aug. 28, 2008

Related U.S. Application Data

(60) Division of application No. 10/967,951, filed on Oct. 19, 2004, now Pat. No. 7,551,562, which is a continuation-in-part of application No. 10/693,721, filed on Oct. 25, 2003, now Pat. No. 7,397,789, which is a continuation of application No. 09/751,262, filed on Dec. 29, 2000, now Pat. No. 6,704,301.

(51) Int. Cl.
*H04L 12/28* (2006.01)
*H04B 7/00* (2006.01)

(52) U.S. Cl. ..................... 370/401; 455/525

(58) Field of Classification Search .................. None
See application file for complete search history.

(56) References Cited

U.S. PATENT DOCUMENTS

| | | |
|---|---|---|
| 4,939,726 A | 7/1990 | Flammer et al. |
| 5,129,096 A | 7/1992 | Burns |
| 5,295,154 A | 3/1994 | Meier et al. |
| 5,400,338 A | 3/1995 | Flammer, III |
| 5,455,569 A | 10/1995 | Sherman et al. |
| 5,479,400 A | 12/1995 | Flammer, III et al. |
| 5,563,881 A | 10/1996 | Perelman et al. |
| 5,610,839 A | 3/1997 | Karolak et al. |
| 5,740,366 A | 4/1998 | Mahany et al. |
| 5,974,236 A | 10/1999 | Sherman |
| 5,987,011 A | 11/1999 | Toh |
| 6,044,062 A | 3/2000 | Brownrigg et al. |
| 6,046,992 A | 4/2000 | Meier et al. |
| 6,249,516 B1 | 6/2001 | Brownrigg et al. |
| 6,298,053 B1 | 10/2001 | Flammer, III et al. |
| 6,349,091 B1 | 2/2002 | Li |
| 6,349,210 B1 | 2/2002 | Li |
| 6,385,174 B1 | 5/2002 | Li |
| 6,437,692 B1 | 8/2002 | Petite et al. |
| 6,522,881 B1 * | 2/2003 | Feder et al. .................. 455/437 |

(Continued)

*Primary Examiner* — Eunsook Choi
(74) *Attorney, Agent, or Firm* — Brian R. Short (57) ABSTRACT

An apparatus and method for communicating link quality information between access nodes is disclosed. A first step includes a first access node transmitting first routing packets. A second step includes a second access node receiving at least one of the first routing packets over a first direction of a first link. A third step includes the second access node transmitting second routing packets. A fourth step includes the first access node receiving at least one of the second routing packets over a second direction of the first link, and determining a first direction link quality of the first link based upon the second routing packets.

22 Claims, 7 Drawing Sheets

U.S. PATENT DOCUMENTS

| | | |
|---|---|---|
| 6,678,252 B1 | 1/2004 | Cansever |
| 6,704,301 B2 | 3/2004 | Chari et al. |
| 6,728,514 B2 | 4/2004 | Bandeira et al. |
| 6,804,532 B1 | 10/2004 | Moon et al. |
| 6,829,347 B1 | 12/2004 | Odiaka |
| 6,850,502 B1 | 2/2005 | Kagan et al. |
| 6,885,660 B2 | 4/2005 | Inbar et al. |
| 6,965,575 B2 | 11/2005 | Srikrishna et al. |
| 6,973,039 B2 | 12/2005 | Redi et al. |
| 6,993,341 B2 * | 1/2006 | Hunzinger ............... 455/450 |
| 7,558,818 B2 * | 7/2009 | Joshi et al. ............... 709/200 |
| 2004/0087276 A1 * | 5/2004 | Attar et al. ............... 455/63.4 |
| 2004/0246935 A1 * | 12/2004 | Joshi et al. ............... 370/338 |
| 2004/0252643 A1 * | 12/2004 | Joshi ............... 370/338 |

* cited by examiner

DETERMINING BIDIRECTIONAL PATH QUALITY WITHIN A WIRELESS MESH NETWORK

RELATED PATENT APPLICATIONS

This patent application is a divisional of patent application Ser. No. 10/967,951 filed on Oct. 19, 2004 and issued as U.S. Pat. No. 7,551,562 on Jun. 23, 2009, which is a continuation-in-part of patent application Ser. No. 10/693,721 filed on Oct. 25, 2003 and issued as U.S. Pat. No. 7,397,789 on Jul. 8, 2008, which is a continuation of U.S. application Ser. No. 09/751,262 filed on Dec. 29, 2000 now issued U.S. Pat. No. 6,704,301, both of which are herein incorporated by reference.

FIELD OF THE INVENTION

The invention relates generally to wireless communications. More particularly, the invention relates to a method and apparatus for determining bidirectional path quality within a wireless mesh network.

BACKGROUND OF THE INVENTION

Packet networking is a form of data communication in which data packets are routed from a source device to a destination device. Packets can be networked directly between a source node and a destination node, or the packets can be relayed through a number of intermediate nodes.

A wireless network can include a wireless device being connected to a network through a base station that is wired to the network. The wireless device can transmit data packets that are received by the base station and then routed through the network. The wireless network can include many base stations that are each wired to the network. This type of wireless network is limited because it requires wired connection to each base station.

Figure 1:
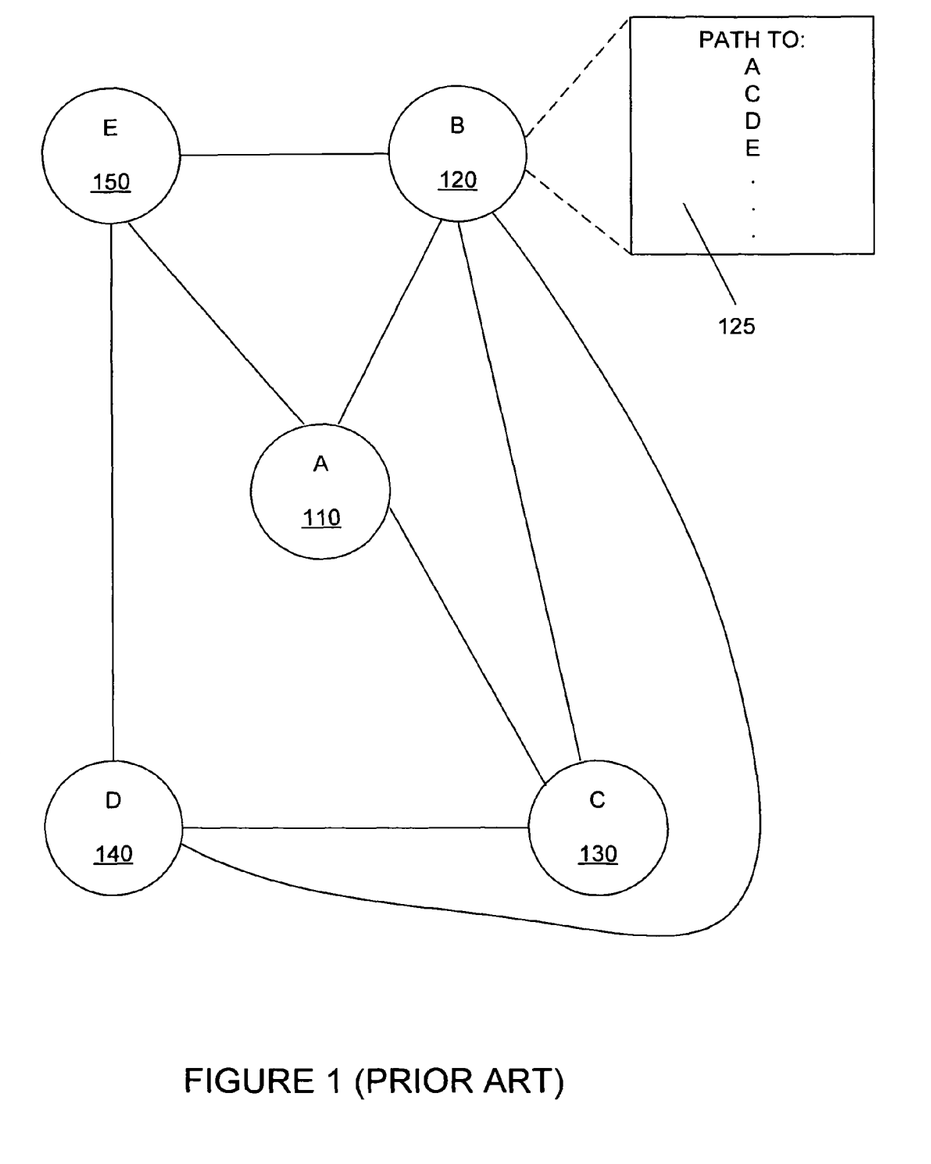
FIG. 1 shows a prior art mesh network.

FIG. 1 shows a prior art mesh network that requires fewer wired connections. The mesh network includes interconnected nodes A 110, B 120, C 130, D 140, E, 150. One or more of the nodes is connected to another network through, for example, a gateway. As shown in FIG. 1, each node 110-150 is required to maintain a full tree 125, to access each node and each gateway to which the node B 120 (for example) gains access. This is disadvantageous because it requires a large memory, which expands as the network expands.

In wireless networks, the quality of the links within the mesh network can be asymmetrical. That is, the quality of a link can vary depending upon the direction in which signals are traveling through the link. This can make selecting optimal routes between access nodes harder to identify. Additionally, the quality of the links between the nodes can vary over time.

It is desirable to have a wireless mesh network that can continually analyze the quality of routing paths through the wireless mesh network, and select an optimal path from among all available routing paths.

SUMMARY OF THE INVENTION

The invention includes an apparatus and method for analyzing a quality of routing paths of a wireless network, and allows selection an optimal path from among all available routing paths.

An embodiment includes a method of communicating link quality information between access nodes. The method includes a first access node transmitting first routing packets and a second access node receiving at least one of the first routing packets over a first direction of a first link. The second access node transmits second routing packets. The first access node receives at least one of the second routing packets over a second direction of the first link, and determines a first direction link quality of the first link based upon the second routing packets.

Another embodiment includes a wireless mesh network. The wireless mesh network includes at least one gateway, the at least one gateway transmitting beacons. At least one access node receives the beacons from the gateway, and selects a routing path to the gateway based at least partially upon an upstream link quality of a link between the at least one gateway and the at least one access node.

Another embodiment includes a wireless access node. The wireless access node receives routing packets from an upstream access node or an upstream gateway. The access node determines upstream link qualities and downstream link qualities of a data path to at least one gateway from the routing packets. The access node then selects an optimal data path to a gateway based upon the upstream link qualities and downstream link qualities of the available data paths.

Other aspects and advantages of the present invention will become apparent from the following detailed description, taken in conjunction with the accompanying drawings, illustrating by way of example the principles of the invention.

DETAILED DESCRIPTION

As shown in the drawings for purposes of illustration, the invention is embodied in a method and apparatus for determining bidirectional path quality within a wireless mesh network. The bidirectional path quality can be used to select routing paths through the mesh network.

Figure 2:
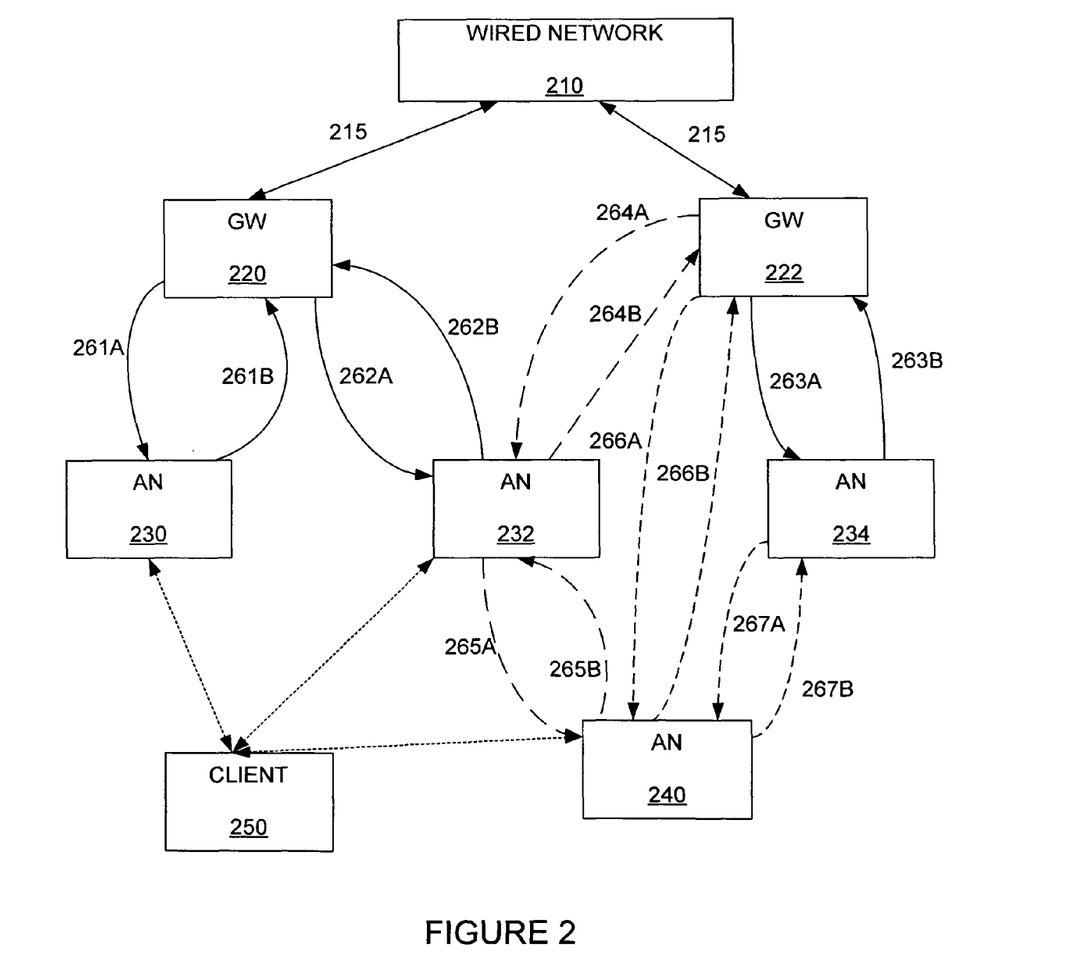
FIG. 2 shows one example of a wireless network in which embodiments of methods of determining bidirectional path qualities are operable.

FIG. 2 shows one example of a wireless network in which embodiments of the methods of determining bidirectional path qualities are operable. The wireless network is connected to a wired network 210. The wired network 210 is typically connected to the internet, but can be connected to other types of wired networks. The mesh network provides a scalable routing solution that uses bandwidth efficiently, adapts quickly to changes in network topology and connectivity, is self-administering, easily deployable, automatically partitions the network in order to optimally exploit available wired connections and is easy to implement. The network architecture includes one or more wired gateways that can be simultaneously members of the wireless network and the (wired) Internet. Additionally, the network architecture can include a large number of access nodes that are members of the wireless network and have access to the wired Internet only through the gateways.

The wireless network includes gateways 220, 222 which are coupled to the wired network 210. The gateways 220, 222 typically include high bandwidth connections 215 to the wired network 210 which can be wired or wireless. A gateway is an access node that can originate beacons.

Access nodes 220, 222, 230, 232, 234, 240 are coupled either directly or indirectly to the gateways 220, 222. That is, each access node is either directly connected to an upstream gateway 220, 222, or indirectly connected through another access node to at least one of the upstream gateways 220, 222. Many factors can be included in the decision of which access nodes or gateways each access node is connected. Clearly, the network of FIG. 2 can include any number of additional gateways and access nodes. As shown in FIG. 2, a client 250 can obtain access to the network by establishing a connection to an available access node, such as, any of access nodes 230, 232, 240.

Gateways 220, 222 broadcast routing packets (beacons), which can be used to determine routing between access nodes 230-240 and gateways 220, 222 of the network. The beacons are received by all first-level access nodes (for example, access nodes 230, 232, 234), which are access nodes that are able to receive gateway transmitted beacons, and directly route data through to a gateway.

The beacons are used to establish a route from each access node to a gateway. The first level access nodes re-broadcast the beacon data, attaching their own information to the beacon. The information indicates to the second level access nodes that the path to the gateway includes the first level access node.

For one embodiment, the link quality of the beacon received determines whether that beacon is rebroadcast by the system. If the quality of the beacon is above a determined threshold, it is rebroadcast. The beacons can be used to determine the quality of the link in both an upstream (towards a gateway) direction, and in a downstream (away from a gateway) direction. The upstream and the downstream link qualities can be used by each access node to select the best data routing path to a gateway.

The first level access nodes 230, 232, 234 include upstream links, and downstream links to the gateways 220, 222. As shown in FIG. 2, access node 230 includes a downstream link 261A and an upstream link 261B with the gateway 220, access node 232 includes a downstream link 262A and an upstream link 262B with the gateway 220, and access node 234 includes a downstream link 263A and an upstream link 263B with the gateway 222. The quality of a downstream link can be different than the quality of the corresponding upstream link. For example, the quality of the downstream link 261A can be different than the quality of the upstream link 261B, the quality of the downstream link 262A can be different than the quality of the upstream link 262B, and the quality of the downstream link 263A can be different than the quality of the upstream link 263B. Link asymmetries can arise because of differences in transmit power levels at each end of the link, or due to environmental effects or signal interference.

The asymmetrical characteristics of the links between access nodes and the gateways can lead to non-optimal routing selections if, for example, the quality of the upstream links is not included in routing decisions by access nodes to gateways. Each gateway and access node transmits beacons. All access nodes and gateways that receive the beacons can make an estimate of the quality of the link based upon the reception of the beacons. The estimates can include both upstream link quality and downstream link quality. Once each access node has the upstream and downstream link qualities within every possible data path to a gateway, the access node can make a selection of the best available data path.

As shown in FIG. 2, the first level access node 232 routes data through the gateway 220. However, the access node 232 could have selected the gateway 222 to route data. A possible link between the access node 232 and the gateway 222 includes the downlink 264A and the uplink 264B. The access node 232 selects the gateway to route data by selecting the best combination of uplinks and downlinks. What is the best combination can depend upon the type of data being routed to and from the gateway. If the access node 232 determines that the downlink 264A/uplink 264B combination of the gateway 222 is better than the downlink 262A/uplink 262B combination of the gateway 220, then the access node 232 can select to route date through the gateway 222.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node.

FIG. 2 also includes a second level access node 240. As shown, the access node 240 can select a data path through access node 232 (through downlink 265A and an uplink 265B), through access node 234 (through downlink 267A and an uplink 267B), or through gateway 222 (through downlink 266A and uplink 266B). The access node 240 makes a data path routing selection based upon the best quality combination of the links (downstream and upstream) within the available data paths to a gateway.

The depth of re-broadcast can be determined by the network. For example, an access node may rebroadcast a beacon only if there are 5 or fewer hops between the access node and the gateway. The number of hops associated with an access node defines how many intermediate access nodes there are between the access node and a gateway. First level access nodes (as defined above) are one hop away from a gateway. Second level access nodes are two hops away from a gateway.

For another embodiment, other link quality factors, such as traffic congestion, battery status of upstream access nodes, thickness of the pipeline, backend (i.e. gateway) capacity, latency, or other factors may be used to determine whether the beacon should be rebroadcast.

Figure 3:
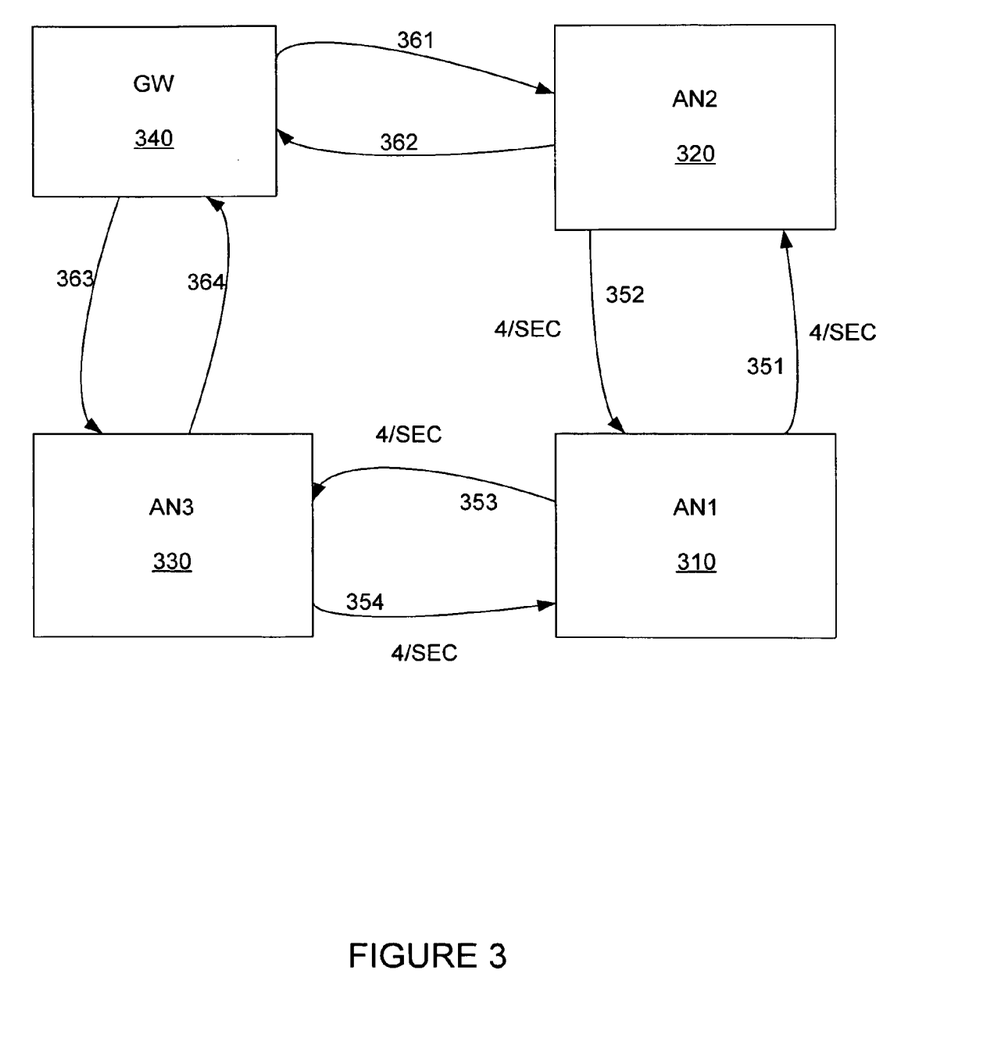
FIG. 3 shows access nodes determining and communicating link qualities of communication links between the access nodes.

FIG. 3 shows access nodes determining and communicating link qualities of communication links between the access nodes. A first access node 310 transmits first routing packets which are received by a second access node 320 over a first direction 351 of a first link. An embodiment includes the access node 310 transmitting a predetermined number of routing packets per unit of time. For example, FIG. 3 indicates that 4 routing packets are transmitted per second. The second access node 320 receives the first routing packets and determines a quality of the first direction 351 of the first link. The quality of the first direction 351 of the first link can be determined, for example, by calculating the percentage of first routing packets that are successfully received by the second access node 320. If, for example, 3 routing packets per second are received by the second access node 320, the second access node can determine the quality of the first direction 351 of the first link to be 75%.

The second access node 320 transmits second routing packets. The second routing packets can be received by the first access node 310 over a second direction 352 of the first link. Again, the second access node 320 can transmit a predetermined number of routing packets per unit of time. For example, FIG. 3 indicates that 4 routing packets are transmitted per second. The second routing packets can be transmitted to include the quality of the first direction 351 of the first link. The first access node receives at least one of the second routing packets over a second direction of the first link, and determines a first direction link quality of the first link based upon the second routing packets. The first access node can also determine a second direction link quality of the first link based upon the second routing packets by calculating the percentage of successfully received second routing packets.

If the access nodes 310, 320 are within a mesh network as shown in FIG. 2, an embodiment includes the first access node being downstream from the second access node, and the first access node making a routing decision to a gateway (such as gateway 340) based upon the second routing packets. More specifically, the routing decision can be based upon information within the second routing packets (for example, first direction link quality), and/or the routing decision can be based upon a quality of the received second routing packets (for example, the percentage of second routing packets received or second routing packet SNR).

An embodiment includes the first access node 310 being downstream from the second access node 320, and the first access node 310 making a routing decision to a gateway 340 based at least partially upon the first direction link quality of the first link and the second direction link quality of the first link. As stated earlier, the first direction link quality can be determined by determining a percentage of routing packets per unit of time received by the second access node 320, and the second direction link quality can be determined by determining a percentage of second routing packets per unit of time received by the first access node 310.

The mesh network can additionally include a third access node 330 receiving at least one of the first routing packets over a first direction 353 of a second link from the first access node 310. The third access node 310 can also transmit third routing packets. An embodiment includes the first access node receiving at least one of the third routing packets over a second direction 354 of the second link, and determining a first direction link quality of the second link based upon the third routing packets.

Having received the second routing packets and the third routing packets, the first access node can select a route through at least one of the second node and the third node at least partially based upon the first direction link quality of the first direction of the first link and the first direction link quality of the first direction of the second link.

The mesh network can further include a gateway 340 which the second access node 320 and third access node 330 can be connected. The connections include downstream links 362, 363 and upstream links 362, 364. As will be described, the further upstream links can be used for data path selections to the gateways. Eventually, routing packets transmitted by all access nodes within the mesh network include information about all neighboring access nodes. This information typically includes forward and reverse link qualities of all neighboring access nodes. A neighboring access node is one which can receive routing packets directly (without being delayed) or that can transmit routing packets directly (without being delayed) to the access node.

The routing packets can be designated as beacons, and include routing information. The beacons can be transmitted according to an 802.11 protocol. Any of the access nodes can be operable as gateways.

Figure 4:
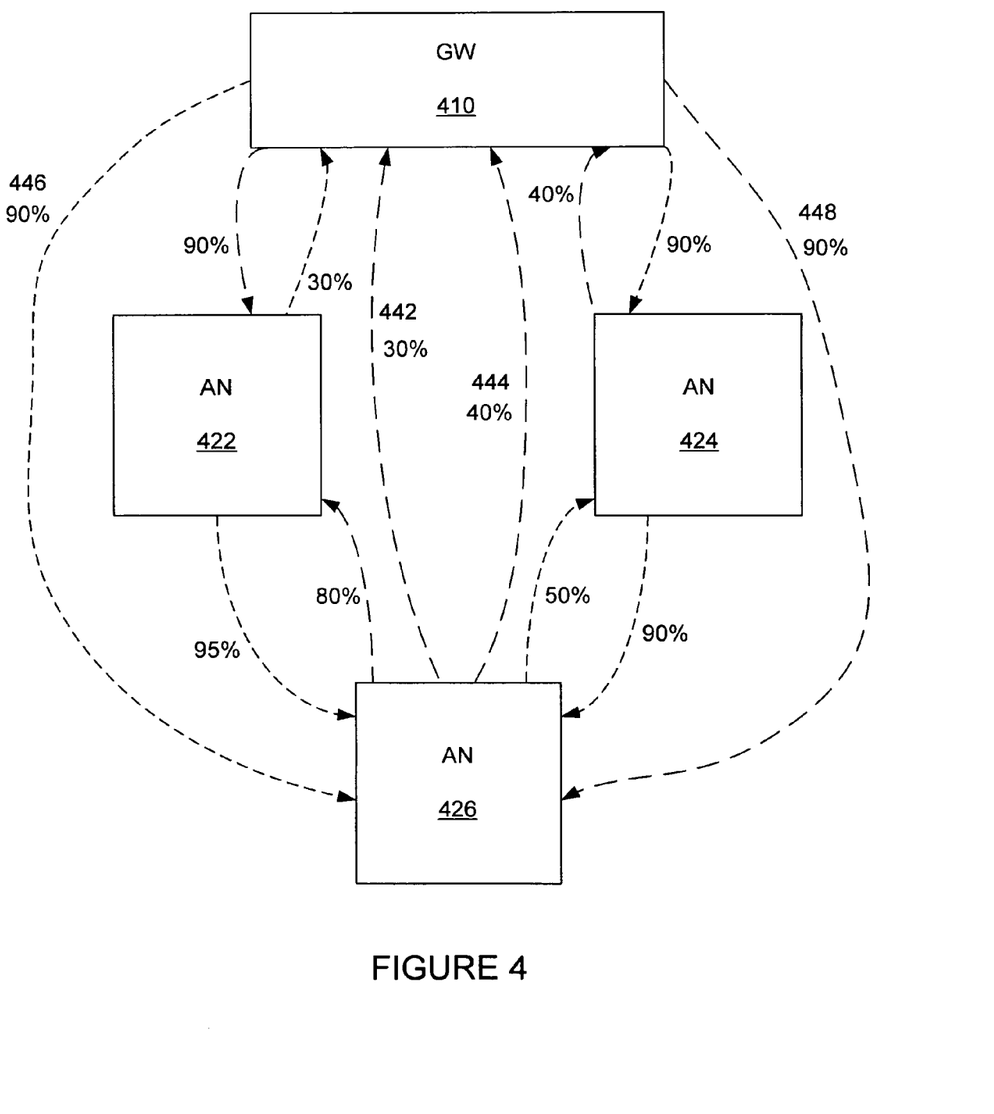
FIG. 4 shows a mesh network that includes data path selection based upon uplink and downlink qualities.

FIG. 4 shows a mesh network that includes data path selection based upon uplink and downlink qualities. As shown, a first access node 426 can select a data path route to a gateway 410 through a second access node 422 or a third access node 424 depending upon the quality of upstream and downstream links within data paths provided by the second access node 422 or the third access node 424.

The data paths can be assigned an overall quality value depending upon the quality of the links within the data paths. For example, a first downstream data path 446 through the second access node 422 can be assigned a first overall quality value based upon a quality value of downstream links from the gateway 410 and through the second access node 422.

As shown, the downstream links within the first downstream data path 446 include quality values of 90% and 95%. The overall quality value of the data path can be 90%, equating to the worst valued link within the downstream data path, or the overall quality value of the data path can be 81%, equating to the product of the link qualities within the downstream data path.

A first upstream data path 442 can be assigned an overall quality value of 30%, based upon the worst valued link quality values (80% and 30%) of the upstream links within the upstream data path 442, or the first upstream data path 442 can be assigned an overall quality value of 24% based upon the product of the quality values.

A second downstream data path 448 can be assigned a quality value of 90% based upon the worst case quality values (90% and 90%) of the downstream links within the downstream data path 448, or the second downstream data path 448 can be assigned a quality value of 81% based upon the product of the quality values of the downstream links within the downstream data path 448.

A second upstream data path 444 can be assigned a quality value of 40% based upon the quality values (40% and 50%) of the upstream links within the upstream data path 444, or the second upstream data path 444 can be assigned an overall quality value of 20% based upon the product of the quality values.

As described, the quality values of data paths can be determined by the worst quality value of the links within the path, or by the product of the quality values of the links within the path. However, other methodologies can be used to determine the quality values of the data paths. Additionally, one method of determining the quality values of the data paths can be used for upstream data paths, and another method can be used for determining the quality value of downstream data paths.

The first access node 426 selects a data path to the gateway 410 based upon the quality values of all the available downstream and upstream data paths. The first access node will probably select the data path through the third access node 424 rather than the data path through the second access node 422 because the data path through the third access node includes upstream/downstream qualities of 90% and 40% (assuming a worst case link analysis for path quality determination), whereas the data path through the second access node includes upstream/downstream qualities of 90% and 30%.

The link qualities within paths can be determined by persistence, i.e. the number of times in the last several routing cycles that the particular beacon was received. For one embodiment, the link qualities with each path reflect the reliability that a path to the gateway provided by the beacon will be available for a reasonable time. The link qualities are determined by continuously monitoring the beacons as they are received in every cycle. Whenever the beacon is not received in a cycle, the link qualities associated with that path are decreased. The beacon is only transmitted if its link quality within a path is sufficiently high.

Beacon Repopulation

An implementation of a mesh network includes all gateways and access nodes within the network transmitting a predetermined number of routing packets (beacons) within a unit of time. For example, the gateways and access nodes can be implemented to transmit 4 beacons per second. The access nodes typically receive a percentage of beacons transmitted from an upstream device (upstream access node or upstream gateway). Therefore, merely modifying and retransmitting beacons received from an upstream device (gateway or access node) would result in a diminishing number of beacons with each hop within the mesh network. The access nodes are able to maintain transmission of the desired number of beacons per second by originating beacons themselves.

The beacons originated at access nodes can be duplicates of the retransmitted beacons, or they can be original beacons that are traceable to the specific originating access node. The transmission of the beacons should allow receiving devices to determine a quality of the transmission link (upstream or downstream) the beacons traveled. For downstream devices, the beacons may provide the downstream device with enough information that the downstream device can determine the quality of the links (upstream and downstream) between the downstream device and at least one gateway.

The contents of all the beacons may not be identical. In particular, some fraction of the beacons may contain (upstream and downstream) quality of links to and from all neighboring access nodes. Other beacons may contain less information. The purpose of sending fewer large beacon packets (containing link information for all neighboring access nodes) is to limit bandwidth utilization by routing control traffic.

Figure 5:
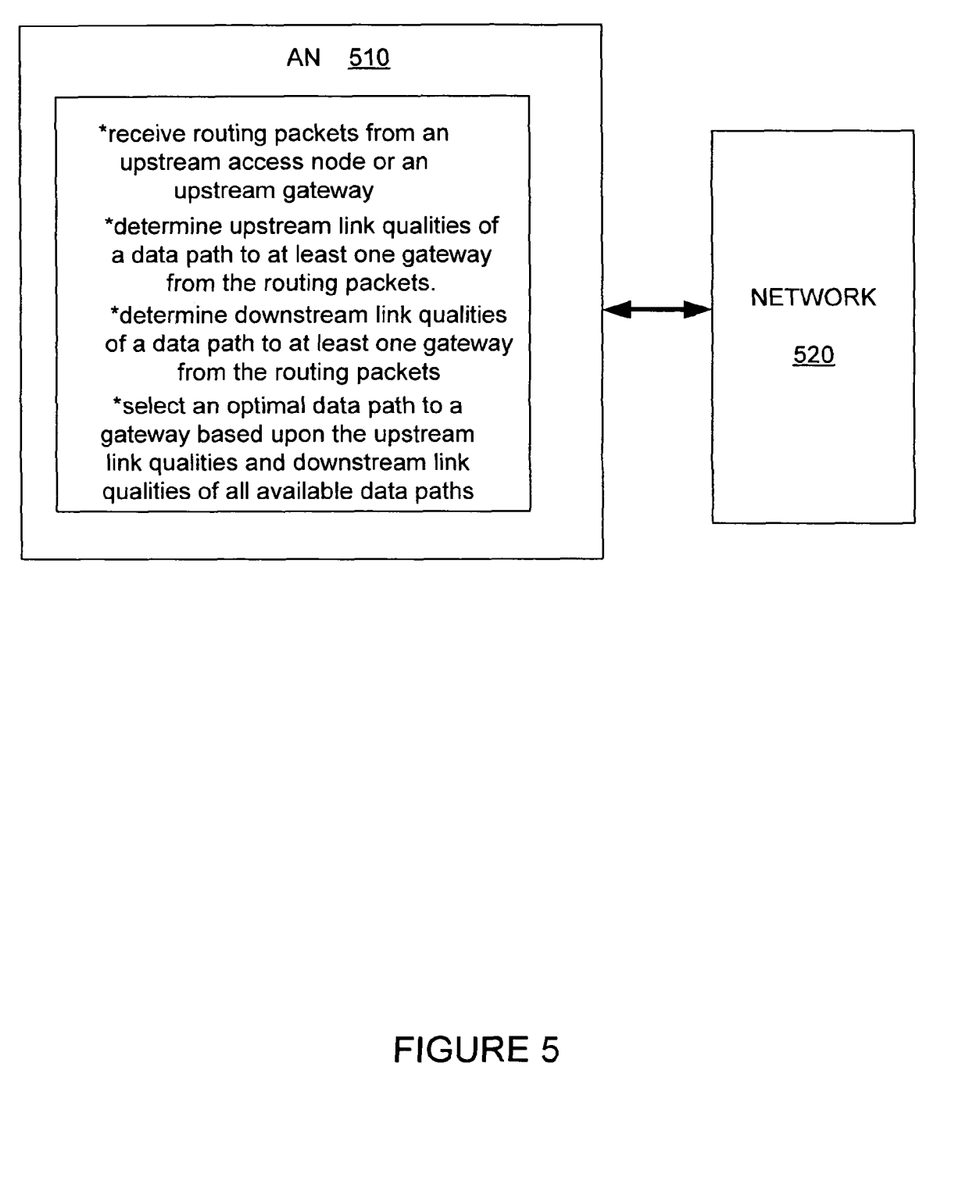
FIG. 5 shows an embodiment of an access node.

FIG. 5 shows an embodiment of an access node 510 connected (typically, wirelessly) to a network 520. It will be apparent to those of ordinary skill in the art, however that other alternative systems of various system architectures may also be used. The access node has the capability to receive routing packets from an upstream access node or an upstream gateway. The access node is able to determine upstream link qualities of a data path to at least one gateway from the routing packets. The access node is able to determine downstream link qualities of a data path to at least one gateway from the routing packets. The access node then selects an optimal data path to a gateway based upon the upstream link qualities and downstream link qualities of all available data paths.

The access node typically includes a bus or other internal communication means for communicating information, and a processor coupled to the bus for processing information. The system further comprises a random access memory (RAM) or other volatile storage device (referred to as memory), coupled to bus for storing information and instructions to be executed by processor. Main memory also may be used for storing temporary variables or other intermediate information during execution of instructions by processor. The system also comprises a read only memory (ROM) and/or static storage device coupled to bus for storing static information and instructions for processor, and a data storage device such as a magnetic disk or optical disk and its corresponding disk drive. Data storage device is coupled to bus for storing information and instructions.

It will be apparent to those of ordinary skill in the art that the methods and processes described herein can be implemented as software stored in main memory or read only memory and executed by processor. This control logic or software may also be resident on an article of manufacture comprising a computer readable medium having computer readable program code embodied therein and being readable by the mass storage device and for causing the processor to operate in accordance with the methods and teachings herein.

Figure 6:
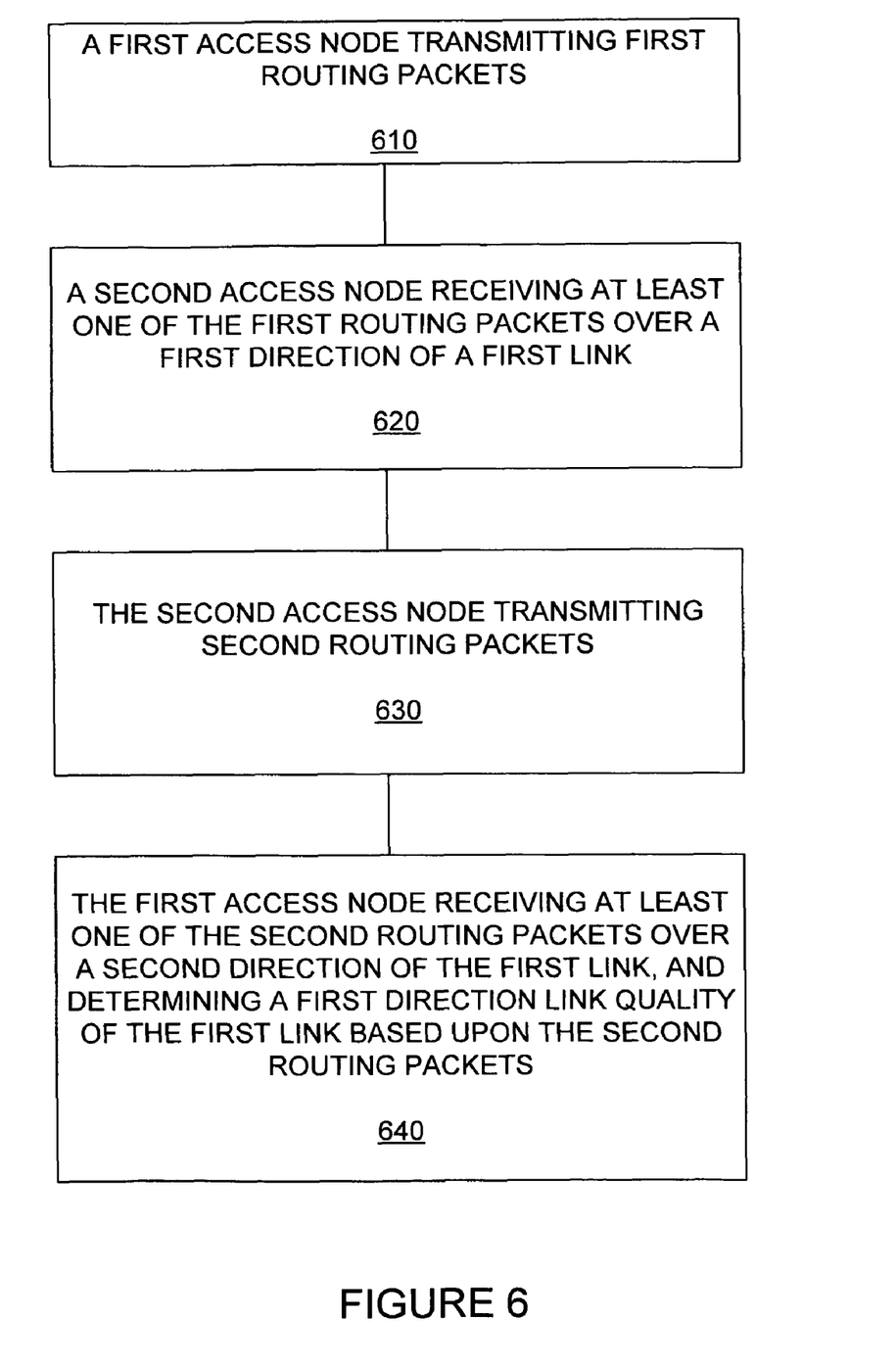
FIG. 6 is a flow chart showing acts included within an embodiment of a method of communicating link quality information between access nodes.

FIG. 6 is a flow chart showing acts included within an embodiment of a method of communicating link quality information between access nodes. A first step 610 includes a first access node transmitting first routing packets. A second step 620 includes a second access node receiving at least one of the first routing packets over a first direction of a first link. A third step 630 includes the second access node transmitting second routing packets. A fourth step 640 includes the first access node receiving at least one of the second routing packets over a second direction of the first link, and determining a first direction link quality of the first link based upon the second routing packets.

Within a mesh network, the first access node can be downstream from the second access node, and the first access node can make a routing decision to a gateway based at least partially upon first direction link quality information within the second routing packets. The first access node can determine a second direction link quality of the first link based upon the second routing packets, and the first access node can additionally make a routing decision to a gateway based at least partially upon the first direction link quality of the first link and the second direction link quality of the first link. An embodiment includes the first direction link quality being determined by the second access node determining a percentage routing packets per unit of time received by the second access node. The second access node can advertise the first direction link quality within the second routing packets. An embodiment includes the second direction link quality being determined by determining a percentage of second routing packets per unit of time received by the first access node.

Figure 7:
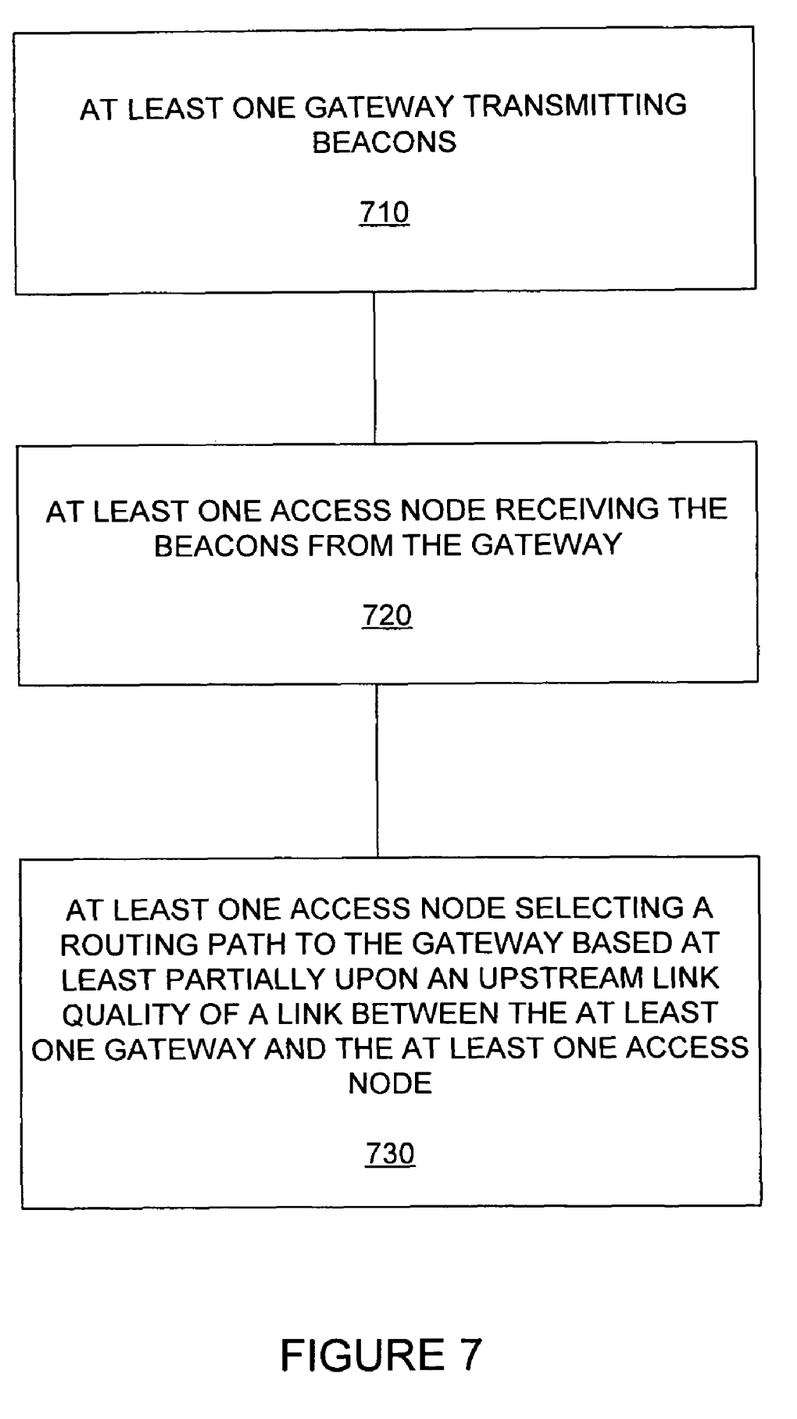
FIG. 7 is a flow chart showing acts included within an embodiment of a method of selecting a data path within a mesh network.

FIG. 7 is a flow chart showing acts included within an embodiment of a method of selecting a data path within a mesh network. A first step 710 includes at least one gateway transmitting beacons. A second step 720 includes at least one access node receiving the beacons from the gateway. A third step 730 includes the at least one access node selecting a routing path to the gateway based at least partially upon an upstream link quality of a link between the at least one gateway and the at least one access node. The at least one access node can also select the routing path to the gateway based at least partially upon a downstream link quality of a link between the at least one gateway and the at least one access node.

An embodiment of the wireless mesh network includes multi-hop access nodes that are more than one hop away from the at least one gateway. The multi-hop access nodes receive beacons from upstream access nodes. An embodiment includes the gateways generating a set number of beacons per unit of time. The downstream access nodes can determine the downstream link quality by determining what percentage of the beacons transmitted by a gateway or an upstream access node, are successfully received by the access node. The gateways and upstream access nodes can determine the upstream link quality by determining what percentage of the beacons transmitted by a downstream access node are successfully received by the gateway or upstream access node. The beacons transmitted by gateways and upstream access nodes can include information of the upstream link quality between the gateways and upstream access nodes, and the downstream access node.

Regarding routing within the mesh network, downstream access nodes that receive the beacons transmitted by the gateways and upstream access nodes can select routing paths to the gateways based at least partially upon information within the received beacons. The information within the received beacons can include upstream link qualities within routing paths to at least one gateway. The downstream access nodes that receive the beacons transmitted by the gateways and upstream access nodes can select routing paths to the gateways based at least partially upon a quality parameter of the received beacons. The routing path selections can be based at least partially upon uplink path qualities within available routing paths from each multi-hop access node to at least one gateway. Additionally, the routing path selections can be based at least partially upon downlink path qualities of available routing paths from each multi-hop access node to at least one gateway. The uplink path quality of each routing path can be determined by a worst uplink quality within the uplink path, or by a product of uplink qualities within the uplink path. The downlink path quality of each path can be determined by a worst downlink quality within the downlink path, or by a product of downlink qualities within the uplink path. The routing selections can include a weighting between uplink path qualities and downlink path qualities. The weighting can be dependent upon the characteristics of data traffic between the access node and the gateway.

Access nodes receiving beacons can repopulate beacons lost in reception, ensuring that the access nodes transmit the same set number of beacons per unit of time. The repopulated beacons can include retransmission of modified received beacons, or the repopulated beacons can include origination of new beacons that identify a source of the beacons.

The gateways play a central role in the discovery of routes by the access nodes. At periodic intervals, each gateway originates a "beacon" which is broadcast to all access nodes within receiving range of the gateway. The time interval between successive broadcasts of the beacon defines a routing cycle. The beacon is a routing packet—a short data packet that contains the address of the gateway. For one embodiment, the beacon includes the following information: (1) a sequence number which identifies which routing cycle it initiates, 2) the address (MAC or IP) of the gateway, 3) a message integrity check. For one embodiment, the address of the gateway may be included in an Ethernet header or IP header of the beacon message.

Each level two access node rebroadcasts the beacon. For one embodiment, it rebroadcasts the beacon after having appended its address to the beacon. For one embodiment, it rebroadcasts the beacon after having incremented the hop-count of the path back to the gateway. For another embodiment, it rebroadcasts the beacon unaltered. As discussed above, this optimal path or optimal beacon may be selected based on link quality, priority in receiving the beacon, or based on another evaluation. By iteration of this process at each access node level, each access node that has connectivity to the gateway (i.e., that can link to the gateway through functional links potentially mediated by other access nodes) becomes aware of its own connectivity to the gateway. For one embodiment, each access node knows a complete path to the gateway. For another embodiment, each access node knows only the next upstream access node on way to the gateway.

For one embodiment, the access nodes only rebroadcast the beacons up to a specified level. Thus, for example, an access node that has more than ten hops to the gateway would not rebroadcast. In this instance, if an access node is outside of the acceptable latency range of a gateway, it may not receive a path to the gateway. This may be indicated to the user, such that the user can either use an alternative means, or move the access node. Since these systems are for wireless broadcast, this is the equivalent of being out of range. A mobile device may be moved back into range. Since the beacons are rebroadcast periodically, the next time that the wireless device is within range of a beacon, it would again receive a path to the gateway.

Although specific embodiments of the invention have been described and illustrated, the invention is not to be limited to the specific forms or arrangements of parts so described and illustrated. The invention is limited only by the appended claims.

What is claimed:

1. A wireless mesh network comprising:
at least one access node transmitting first routing packets;
at least one gateway estimating an upstream link quality based on reception of the first routing packets, wherein the upstream link quality is determined by determining what percentage of first routing packets are successfully received by the at least one gateway;
the at least one gateway transmitting second routing packets, wherein the second routing packets include the upstream link quality;
the at least one access node receiving the second routing packets from the gateway, the at least one access node selecting a routing path to the gateway based at least partially upon the upstream link quality of a link between the at least one gateway and the at least one access node; and
multi-hop access nodes that are more than one hop away from the at least one gateway, the multi-hop access nodes receiving routing packets from upstream access nodes; wherein
the at least one access node repopulates beacons lost in reception, ensuring that the at least one access node transmits the same set number of routing packets per unit of time.

2. The wireless mesh network of claim 1, further comprising the at least one access node selecting the routing path to the gateway based at least partially upon a downstream link quality of a link between the at least one gateway and the at least one access node.

3. The wireless mesh network of claim 1, wherein access node upstream link quality is determined by routing packets transmitted by the at least one access node or at least one multi-hop access node.

4. The wireless mesh network of claim 1, wherein access node downstream link quality is determined by routing packets transmitted by at least one of a gateway or an upstream access node.

5. The wireless mesh network of claim 1, wherein the gateways generate a set number of routing packets per unit of time.

6. The wireless mesh network of claim 4, wherein downstream access nodes determine the downstream link quality by determining what percentage of routing packets transmitted by a gateway or an upstream access node are successfully received by the access node.

7. The wireless mesh network of claim 1, wherein gateways and upstream access nodes determine the upstream link quality by determining what percentage of the routing packets transmitted by a downstream access node are successfully received by the gateway or upstream access node.

8. The wireless mesh network of claim 7, wherein routing packets transmitted by gateways and upstream access nodes include information of the upstream link quality between the gateways and upstream access nodes, and the downstream access node.

9. The wireless mesh network of claim 7, wherein downstream access nodes that receive the routing packets transmitted by the gateways and upstream access nodes select routing paths to the gateways based at least partially upon information within the received routing packets.

10. The wireless mesh network of claim 9, wherein the information within the received routing packets includes upstream link qualities within routing paths to at least one gateway.

11. The wireless mesh network of claim 1, wherein downstream access nodes that receive the routing packets transmitted by the gateways and upstream access nodes select routing paths to the gateways based at least partially upon a quality parameter of the received routing packets.

12. The wireless mesh network of claim 1, wherein routing path selections are based at least partially upon uplink path qualities within available routing paths from each multi-hop access node to at least one gateway.

13. The wireless mesh network of claim 12, wherein the uplink path quality of each routing path is determined by a worst uplink quality within the uplink path.

14. The wireless mesh network of claim 12, wherein the uplink path quality of each routing path is determined by a product of uplink qualities within the uplink path.

15. The wireless mesh network of claim 1, wherein routing path selections are based at least partially upon downlink path qualities of available routing paths from each multi-hop access node to at least one gateway.

16. The wireless mesh network of claim 15, wherein the downlink path quality of each path is determined by a worst downlink quality within the downlink path.

17. The wireless mesh network of claim 15, wherein the downlink path quality of each path is determined by a product of downlink qualities within the uplink path.

18. The wireless mesh network of claim 1, wherein the routing selections include a weighting between uplink path qualities and downlink path qualities.

19. The wireless mesh network of claim 18, wherein the weighting is dependent upon the characteristics of data traffic between the access node and the gateway.

20. The wireless mesh network of claim 1, wherein the repopulated beacons include retransmission of modified received routing packets.

21. The wireless mesh network of claim 20, wherein the repopulated routing packets include origination of new routing packets that identify a source of the routing packets.

22. A method of routing a data path within a mesh network, comprising:

a gateway receiving first routing packets from at least one access node and determining an uplink quality of an upstream link between the at least one access node and the gateway, wherein the upstream link quality is determined by determining what percentage of first routing packets are successfully received by the gateway from at least one access node the gateway transmitting beacons, wherein the beacons include the determined uplink quality;

at least one access node receiving the beacons from the gateway;

the at least one access node selecting a routing path to the gateway based the received beacons, and at least partially upon an upstream link quality of a link between the at least one gateway and the at least one access node, and multi-hop access nodes that are more than one hop away from the at least one gateway receiving routing packets from upstream access nodes; wherein at least one access node repopulates beacons lost in reception, ensuring that the at least one access node transmits the same set number of routing packets per unit of time.

\* \* \* \* \*